United States Patent
Kutzmann et al.

(10) Patent No.: US 11,214,376 B2
(45) Date of Patent: Jan. 4, 2022

(54) ANTI-ICE PULSED JET HILLER REACTOR

(71) Applicant: THE BOEING COMPANY, Chicago, IL (US)

(72) Inventors: Aaron J. Kutzmann, Long Beach, CA (US); William Noll Kamerow, Huntington Beach, CA (US); Steven Edmon Chapel, Long Beach, CA (US); Richard Phillip Ouellette, Long Beach, CA (US); Robert Erik Grip, Rancho Palos Verdes, CA (US)

(73) Assignee: THE BOEING COMPANY, Chicago, IL (US)

( * ) Notice: Subject to any disclaimer, the term of this patent is extended or adjusted under 35 U.S.C. 154(b) by 275 days.

(21) Appl. No.: 16/399,609

(22) Filed: Apr. 30, 2019

(65) Prior Publication Data

US 2020/0346765 A1    Nov. 5, 2020

(51) Int. Cl.
| | | |
|---|---|---|
| *B64D 15/04* | (2006.01) | |
| *B64D 15/22* | (2006.01) | |
| *B64C 5/02* | (2006.01) | |
| *B64D 29/00* | (2006.01) | |

(52) U.S. Cl.
CPC ............ *B64D 15/04* (2013.01); *B64D 15/22* (2013.01); *B64C 5/02* (2013.01); *B64D 29/00* (2013.01)

(58) Field of Classification Search
CPC ........ B64D 15/02; B64D 15/04; B64D 15/20; B64D 15/22
See application file for complete search history.

(56) References Cited

U.S. PATENT DOCUMENTS

| | | | | |
|---|---|---|---|---|
| 2,760,740 | A * | 8/1956 | Brass ................... | B64D 15/02 244/134 B |
| 3,592,395 | A * | 7/1971 | Lockwood ........... | F26B 23/026 241/18 |
| 5,285,755 | A * | 2/1994 | Regueiro ............. | F02F 1/4214 123/193.6 |
| 2010/0163677 | A1* | 7/2010 | Rocklin ............... | B64D 15/04 244/134 B |
| 2017/0082067 | A1* | 3/2017 | Maqbool .............. | F02C 9/28 |

* cited by examiner

*Primary Examiner* — Philip J Bonzell
*Assistant Examiner* — Ashesh Dangol
(74) *Attorney, Agent, or Firm* — Patterson + Sheridan, LLP (57) ABSTRACT

Certain aspects of the present disclosure provide an ice management system, including: a plurality of pulsejets located within an interior volume of an aircraft and configured to heat an aircraft surface, wherein each pulsejet of the plurality of pulsejets comprises: an inlet; a combustor; a fuel source; and an exhaust nozzle; and a plurality of intake apertures in the aircraft, wherein each intake aperture of the plurality of intake apertures corresponds to an inlet of one pulsejet of the plurality of pulsejets.

20 Claims, 7 Drawing Sheets

ANTI-ICE PULSED JET HILLER REACTOR

INTRODUCTION

Aspects of the present disclosure relate to ice management systems for crafts, such as aircrafts.

The formation of ice on certain craft parts, such as leading edges of engine inlets and aerodynamic surfaces, may negatively affect performance and create safety issues for the craft. Thus, it is desirable to have means on such craft to prevent ice buildup (anti-ice) and to remove any existing ice (deice) from craft surfaces. Existing anti-ice and deice systems, however, may reduce craft performance, such as by adding weight, introducing additional complexity, affecting aerodynamics, and increasing fuel use.

Accordingly, improved ice management systems are needed.

BRIEF SUMMARY

Certain embodiments provide an ice management system, including: a plurality of pulsejets located within an interior volume of an aircraft and configured to heat an aircraft surface, wherein each pulsejet of the plurality of pulsejets comprises: an inlet; a combustor; a fuel source; and an exhaust nozzle; and a plurality of intake apertures in the aircraft, wherein each intake aperture of the plurality of intake apertures corresponds to an inlet of one pulsejet of the plurality of pulsejets.

In some embodiments of the ice management system, each pulsejet of the plurality of pulsejets is located within a respective, separate interior volume of the aircraft.

Some embodiments of the ice management system further include: a plurality of exhaust apertures in the aircraft, wherein each exhaust aperture of the plurality of exhaust apertures is configured to expel heated gas from the interior volume.

In some embodiments of the ice management system, each exhaust aperture of the plurality of exhaust apertures in the aircraft is configured to expel heated gas from one pulsejet of the plurality of pulsejets.

In some embodiments of the ice management system, the aircraft surface is a leading edge portion of an engine nacelle.

In some embodiments of the ice management system, each pulsejet of the plurality of pulsejets is in a circumferential orientation within the interior volume.

In some embodiments of the ice management system, each pulsejet of the plurality of pulsejets is in a radial orientation within the interior volume.

In some embodiments of the ice management system, a shape of each pulsejet of the plurality of pulsejets is configured to support at least a portion of an inner surface of the interior volume and at least a portion of an inner surface of the aircraft surface.

In some embodiments of the ice management system, the aircraft surface is a leading edge portion of a wing slat.

In some embodiments of the ice management system, the aircraft surface is a leading edge portion of a vertical stabilizer.

Some embodiments of the ice management system further include: a fuel tank located within the vertical stabilizer and connected to the plurality of pulsejets.

Some embodiments of the ice management system further include: an exhaust pipe connected to the interior volume.

In some embodiments of the ice management system, the aircraft surface is a leading edge portion of a horizontal stabilizer.

Some embodiments of the ice management system further include: a fuel tank located within the horizontal stabilizer and connected to the plurality of pulsejets.

Some embodiments of the ice management system further include: an exhaust pipe connected to the interior volume.

In some embodiments of the ice management system, each pulsejet of the plurality of pulsejets further comprises a cross-flow ignition port, and at least one pulsejet of the plurality of pulsejets comprises an ignitor.

In some embodiments of the ice management system, each pulsejet of the plurality of pulsejets is a valveless pulsejet.

Some embodiments of the ice management system further include an ice management system controller configured to: control fuel flow to the plurality of pulsejets; and control an ignitor associated with at least one pulsejet of the plurality of pulsejets.

Certain embodiments further provide a method, including: activating a plurality of pulsejets, wherein: each pulsejet of the plurality of pulsejets is located within an interior volume of an aircraft and configured to heat an aircraft surface, and each pulsejet of the plurality of pulsejets comprises: an inlet; a combustor; a fuel source; and an exhaust nozzle; receiving data from a sensor regarding operation of one or more of the plurality of pulsejets.

Certain embodiments further provide an ice management control system, including: a memory comprising computer-executable instructions; a sensor; a processor in data communication with the sensor and configured to execute the computer-executable instructions and cause the ice management control system to: activate a plurality of pulsejets, wherein: each pulsejet of the plurality of pulsejets is located within an interior volume of an aircraft and configured to heat an aircraft surface, and each pulsejet of the plurality of pulsejets comprises: an inlet; a combustor; a fuel source; and an exhaust nozzle; receive data from the sensor regarding operation of one or more of the plurality of pulsejets.

The following description and the related drawings set forth in detail certain illustrative features of one or more embodiments.

BRIEF DESCRIPTION OF THE DRAWINGS

The appended figures depict certain aspects of the one or more embodiments and are therefore not to be considered limiting of the scope of this disclosure.

To facilitate understanding, identical reference numerals have been used, where possible, to designate identical elements that are common to the drawings. It is contemplated that elements and features of one embodiment may be beneficially incorporated in other embodiments without further recitation.

DETAILED DESCRIPTION

Aspects of the present disclosure provide improved ice management systems, which may be used on crafts for deicing and anti-icing operations. The improved ice management systems described herein may be implemented in any craft part where ice management is desirable. For example, such systems may be used to deice and prevent further ice from forming on aerodynamic surfaces of aircraft, such as the leading edges of wings, slats, stabilizers, and engine inlets, to name a few.

Generally speaking, ice formation on aircraft surfaces can reduce the aerodynamic predictability and efficiency of the aircraft. Further ice formation can damage the airframe and/or engines as it dislodges from a surface. Therefore, it is desirable to proactively manage any ice accumulation and to prevent further ice accumulation on aircraft surfaces.

Ice management systems are regularly used under 21,000 feet during the takeoff, climb, and descent flight segments, although occasionally there is a need to use them above 21,000 feet when icing conditions are present.

Some anti-icing systems rely on bleed air from an engine core to heat an aircraft surface, such as the leading edge of an engine inlet, in order to melt existing ice (deice) and to prevent future ice accumulation (anti-ice). When a bleed air-based ice management system is active, the air bled from the engine core reduce engine thrust and therefore increase fuel burn to make up for the lost thrust. Additionally, the added weight of bleed air-based ice management system components can be significant, which may further affect aircraft performance.

Another form of ice management system relies on electrical heating elements to heat aircraft surfaces to perform deicing and anti-ice operations. However, like bleed air-based systems, electrical heating element-based systems require significant power extraction from the engine to create the current necessary for the heating elements, which affects thrust and fuel burn. In some cases, separate power sources, such as batteries, may be used to avoid impacting engine performance. However, the additional batteries add weight in addition to the weight of the heating elements nevertheless negatively affect aircraft performance.

Yet another form of ice management system is fluid-based. Generally, fluid-based ice management systems work by applying a glycol-based freezing point depressant fluid to cover a craft surface that may accumulate ice. This effectively reduces the freezing point of the surface so ice cannot easily form. Disadvantages of fluid-based systems are that the fluid needs to be frequently refilled, which creates additional maintenance needs, and the fluid layer can impact the aerodynamic performance of the surfaces to which it is applied. Further, fluid-based systems may add significant weight to the airframe, which negatively affects performance. Further yet, engine manufacturers may not allow fluid ingestion into the core due to coking concerns, and the use of glycol-based deicing fluids is becoming more heavily regulated, and thus may not be usable in all scenarios (such as in an aircraft over a populated area).

To overcome the disadvantages of existing ice management systems, embodiments described herein implement pulsejets to provide both heat and vibration to craft surfaces in order to perform deicing and anti-icing operations. The pulsejets described herein may be compact, lightweight, and in some cases, formed in a manner to allow them to act as structural elements in addition to heating elements.

Generally, pulsejets are a type of pulse reactor engine (e.g., a Hiller reactor) wherein combustion occurs in pulses. Pulsejets may be designed to be acoustically resonant such that the forces of combusting fuel can be reflected internally and used to provide some compression of the air and fuel mixture. Beneficially, pulsejets may contain few or no moving parts, and may be running statically (i.e. without the need to have air forced into an inlet by forward motion or other means).

There are two main types of pulsejets, both of which use resonant combustion and harness the expanding combustion products to form a pulsating exhaust jet which produces thrust and heat intermittently. A first type is referred to as a valved pulsejet, which uses one or more mechanical one-way valve(s) to (1) control the flow of expanding exhaust, forcing the hot gas to go out of the back of the pulsejet through an exhaust pipe, and (2) to allow fresh air and more fuel to enter through the intake as the momentum of the escaping exhaust creates a temporary, partial vacuum in the combustion chamber after each combustion event. This temporary vacuum draws in additional air and fuel between pulses, and the valve(s) prevent the combusting gases in the combustion chamber from back flowing through the intake and disrupting the intake airflow.

In some implementations, the mechanical one-way valve is a reed valve, which may be implemented in different configurations. One example configuration is a "daisy valve" in which thin sheets of material ("petals") acts as the reeds. Each petal generally covers an intake aperture at its tip and is bolted to a manifold at the center of the valve. Another example configuration is a rectangular valve grid, which operates with flapper-type pieces of, for example, sheet metal that cover openings in a rectangular grid. These are just a few examples, and other configurations are possible.

Another type of pulsejet is a valveless pulsejet, which has no moving parts. Instead, a valveless pulsejet uses its internal geometry to control the flow of exhaust out of the engine. Because of the lack of a mechanical valve, valveless pulsejets may expel some exhaust out of both the inlet and the exhaust nozzle, but the majority of the thrust and heat produced by combustion leaves through the wider cross-section of the exhaust nozzle, which in-turn creates the partial vacuum necessary to ingest more air and fuel.

Fuel is generally provided to a pulsejet as a gas or atomized liquid spray, which may be mixed with the air in the intake or directly injected into the combustion chamber. In some implementations, pulsejets may need some forced air to initiate operations, but in other implementations a pulsejet is started with only the introduction of fuel and an ignition spark, i.e., without the need for any compressed air. Once running, a pulsejet only requires input of fuel to maintain a self-sustaining combustion cycle.

Embodiments described herein utilize pulsejets within interior volumes (e.g., plenums, ducts, channel, conduit, tube, etc.) behind aircraft surfaces. For example, portions of a craft surface, such as the leading edge of an engine inlet or another aerodynamic element (e.g., a slat or stabilizer) may form an outer portion of an interior volume, such as a duct or plenum, and may thus become heated by heated exhaust flows from one or more pulsejets in the interior volume. Further, pulsejets within interior volume may create acoustic vibrations when running (e.g., from the frequency of operation), which may be effective at breaking up existing ice accumulations and preventing further ice accumulation on the outer portion of the interior volume. As such, both the heat and the vibration created by one or more pulsejets may be leveraged for deicing and anti-ice operations.

In some implementations, a valve may be used to "tune" the frequency of the vibrations created by pulsejet operations, or to sweep through various frequencies, in order to further improve the vibration-based de-icing and anti-icing performance of a pulsejet-based ice management system.

In some implementations, the exhaust air from the pulsejet(s) may leave a heated interior volume (e.g., a duct or plenum) through an exhaust aperture, such as a valve (e.g., butterfly valve), louver, outlet duct (e.g., reverse NACA duct), vent, or other actively or passively controlled device.

Unlike other ice management systems, the pulsejet-based ice management systems described herein beneficially reduce weight and complexity of existing systems. Further, because the pulsejets may be have their own fuel supply, they do not impact the fuel available to the main engines, nor the output or efficiency of those engines when running. Further yet, because the pulsejets may be quite compact, they may be installed in advantageous locations without consideration for routing of bleed gas tubes, electric wiring, and the like. Additionally, because the pulsejets may be installed behind aerodynamic surfaces, they do not negatively affect the aerodynamic properties of such surfaces. Finally, in some implementations, the pulsejets may be designed to act as support or structural elements (e.g., supporting the leading edge of an aerodynamic surface).

Example Pulsejet-Based Ice Management Systems in Aircrafts

Figure 1A:
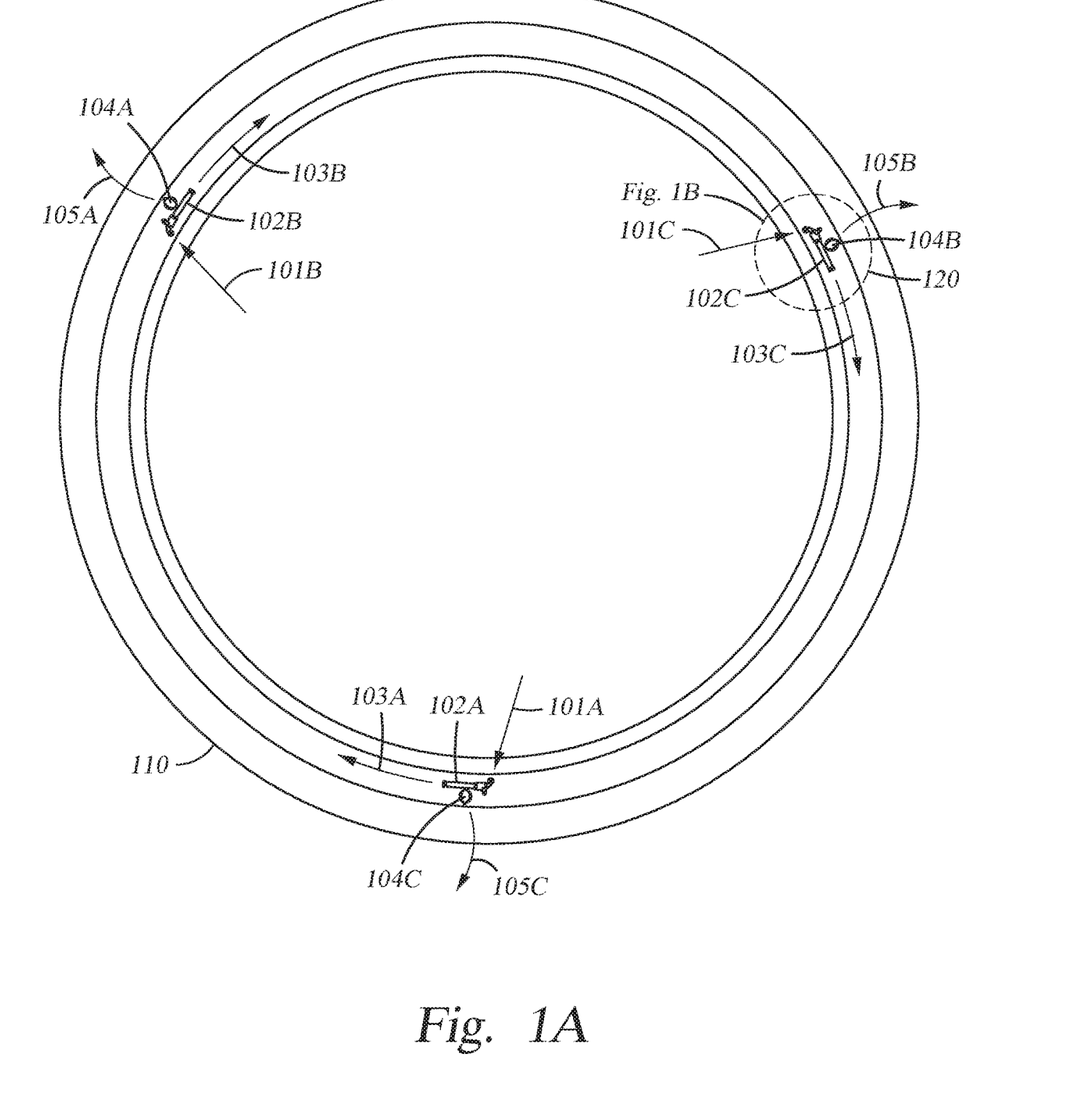
FIGS. 1A and 1B depict an example of a pulsejet-based ice management system installed within an aircraft engine nacelle.
Figure 1B:
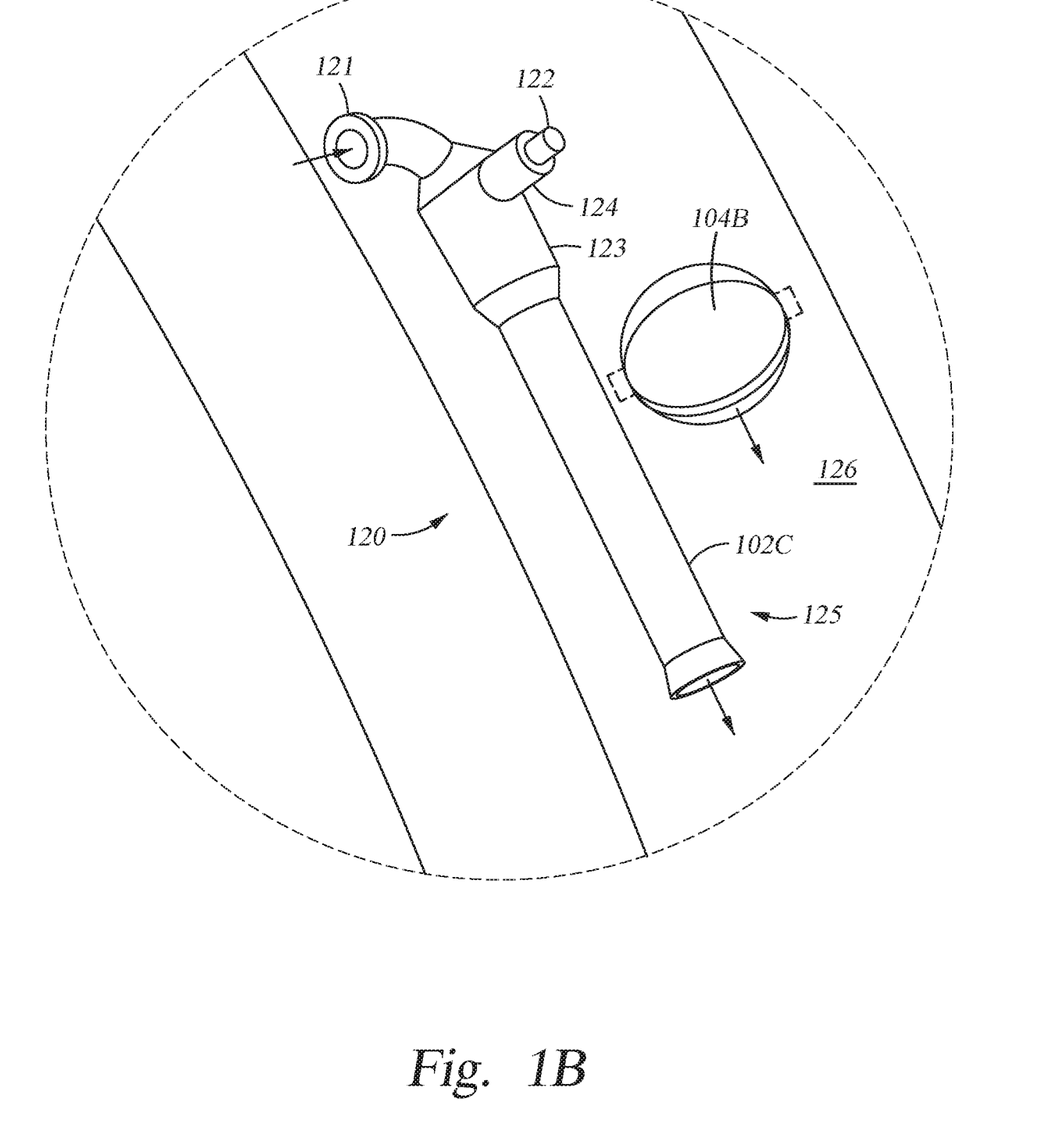

FIGS. 1A and 1B depict an example of a pulsejet-based ice management system installed within an aircraft engine nacelle.

In particular, FIG. 1A depicts a frontal view of an engine nacelle 110, such as may be found on a jet aircraft. In this implementation, three pulsejets, 102A, 102B, and 102C, are installed within nacelle 110 and positioned equidistant from each other (in this example, each ⅓ of the way around nacelle 110). Further in this implementation, each of pulsejets, 102A, 102B, and 102C is mounted in a circumferential orientation such that the heated exhaust gas from the pulsejet will flow around the circumference of nacelle 110. In this example, "circumferential orientation" refers to an orientation of a pulsejet (e.g., 102A, 102B, and 102C) wherein its exhaust nozzle is pointed in a direction along a circumference of a curved geometric volume in which the pulsejet is installed. Thus, in this example, the exhaust from the nozzles of pulsejets 102A, 102B, and 102C promotes flow of the heated gas around the circumference of the curved geometric volume of nacelle 110 (e.g., along arrows 103A-C). This orientation may alternatively be referred to as a circular flow orientation, in which the exhaust nozzle of a pulsejet is pointed in a direction within a geometric volume that will cause heated exhaust gases to flow around the geometric volume and back towards the pulsejet.

Notably, in other implementations, fewer or more pulsejets may be used in a symmetric (e.g., equidistant) or non-symmetric arrangement around the nacelle. Generally speaking, as the number of pulsejets is increased, the duty cycle of each pulsejet may be reduced based on the total heat output needs of the system.

In this example, pulsejet 102A receives intake air 101A via an intake duct or inlet 101 (as depicted in more detail in FIG. 1B). Pulsejet 102A uses intake air 101A to combust fuel and form heated exhaust gas, which flows out of an exhaust nozzle (as depicted in more detail in FIG. 1B) in the direction of arrow 103A. The heated exhaust gas flows around an interior volume of the nacelle, which may be referred to as a duct or plenum within the nacelle, towards an exhaust aperture, which in this example is vent 104A. At vent 104A, the heated exhaust air exits the interior volume as exhaust air 105A.

Similarly, pulsejet 102B uses intake air 101B to combust fuel and form heated exhaust gas, which flows out of an exhaust nozzle in the direction of arrow 103B. The heated exhaust gas flows around another interior volume of the nacelle towards vent 104B. At vent 104B, the heated exhaust air exits the interior volume as exhaust air 105B. Finally, pulsejet 102C uses intake air 101C to combust fuel and form heated exhaust gas, which flows out of an exhaust nozzle in the direction of arrow 103C. The heated exhaust gas flows around yet another interior volume of the nacelle towards vent 104C. At vent 104C, the heated exhaust air exits the interior volume as exhaust air 105C.

Vents 104A-C (which are exhaust apertures in this example) may comprise valves, such as butterfly valves in some implementations. Vents 104A-C may be actively controlled (e.g., via an electronic actuator) or passively controlled (e.g., via a biasing mechanism, such as a spring, or the resiliency of the material itself). In some implementations, the extent of the opening of each vent may be changed based on conditions, such as temperature, fuel flow, speed of the aircraft, and the like. A further benefit of vents 104A-C is the removal of any moisture or condensation that may collect within nacelle 110.

In some implementations, each interior volume (e.g., duct or plenum) within nacelle 110 may be self-contained such that exhaust gases created by a pulsejet at a first end of the interior volume travel through the interior volume and exit at a valve near the second end of the interior volume without ever being able to reach another self-contained interior volume. In other implementations, nacelle 110 may have a single contiguous interior volume having both inlets and outlets (e.g., valves) disposed at various locations along nacelle 110.

When pulsejets 102A-C are engaged, their heated exhaust flows around an interior volume within nacelle 110 and heats the outer surface (e.g., a cowl or lip) of nacelle 110. In particular, in this implementation, the leading edge (i.e., portion of nacelle facing oncoming airflow during movement of the aircraft) is heated by the heat from pulsejets 102A-C and thus any ice accumulation is melted off and any future ice accumulation is prevented. Further, as pulsejets 102A-C run, they create vibrations (from the pulsed combustions) that also serve to dislodge any existing ice accumulation and to prevent any further ice accumulation.

FIG. 1B depicts a closer view from box 120 in FIG. 1A of pulsejet 102C.

Pulsejet 102C includes an inlet (or air intake) 121 exposed to outside air, for example, via an intake aperture or opening in the surface of nacelle 110. In this implementation, inlet 121 is positioned in the flow of oncoming air (i.e., air flowing towards nacelle 110 when a craft carrying nacelle 110 is underway). This may create a ram-air effect that helps create a pressure differential across pulsejet 102C, with relatively higher pressure at inlet 121 and relatively lower pressure at an exhaust nozzle 125. In some implementations, inlet 121 may have a velocity stack design or may be preceded by an aerodynamic duct, such as a NACA duct, to further encourage the pressure differential. However, in other implementations, inlet 121 may be located away from the direct oncoming flow of air. As described above, an advantage of a pulsejet is not needing externally motivated airflow to provide air to combustor 123.

Inlet 121 is connected in this example by a curved intake pipe to combustor 123. The curvature of the inlet pipe allows for inlet 121 to be arranged on a surface of nacelle 110 in a first orientation (e.g., in the flow of oncoming air) while other aspects of pulsejet 102C, such as combustor 123 and exhaust nozzle 125 can be arranged in a different orientation. For example, in FIG. 1B, combustor 123 and exhaust nozzle 125 of pulsejet 102C are arranged circumferentially within the interior volume 126 of nacelle 110 so that heated exhaust air exiting exhaust nozzle 125 will flow around the interior volume 126 of nacelle 110. This arrangement also provides for a better fit of pulsejet 102C within the interior volume 126 of nacelle 110 without the need for a more complicated design.

In this example, a fuel injector 124 acts as a fuel source configured to deliver fuel to combustor 123. The fuel injector may rely on positive pressure created in the fuel line or rail (not depicted) by an upstream fuel pump, or may rely on negative pressure (i.e., vacuum) created in combustor 123 by the action of operation of pulsejet 102C and/or the pressure gradient created across pulsejet 102C.

In some implementations, fuel injector 124 sources fuel from a craft's regular fuel stores through a fuel line connected to a fuel store (such as a wing or fuselage fuel tank). In other implementations, fuel injector 124 may source fuel from its own dedicated fuel tank or reservoir. Pulsejet 102C can use a wide variety of fuels, such as jet fuels, kerosene, propane, methane, natural gas, and others.

Though not depicted in FIG. 1B, fuel injector 124 may be connected to a fuel line or fuel rail, which feeds fuel to other pulsejets, such as pulsejets 102A and 102B. Further, in some implementations, fuel injector 124 may be further connected to an electronic controller that controls the opening and closing (and thereby rate of fuel delivery) of fuel injector 124.

Ignitor 122 is configured to provide an initial ignition of the pulse combustion cycle. As described above, pulsejet 102C is capable of maintaining cyclic combustion without consistent use of ignitor 122. In some implementations, ignitor 122 may be a spark plug, glow plug, or other source of ignition.

Though not depicted in FIG. 1B, in some implementations, pulsejets may include a cross-flow or wave ignition port for spreading ignition from one pulsejet to another. For example, a cross-flow tube or line may allow a flame front to travel between pulsejets. In this way, each pulsejet may not need a separate ignitor, such as ignitor 122.

Figure 2A:
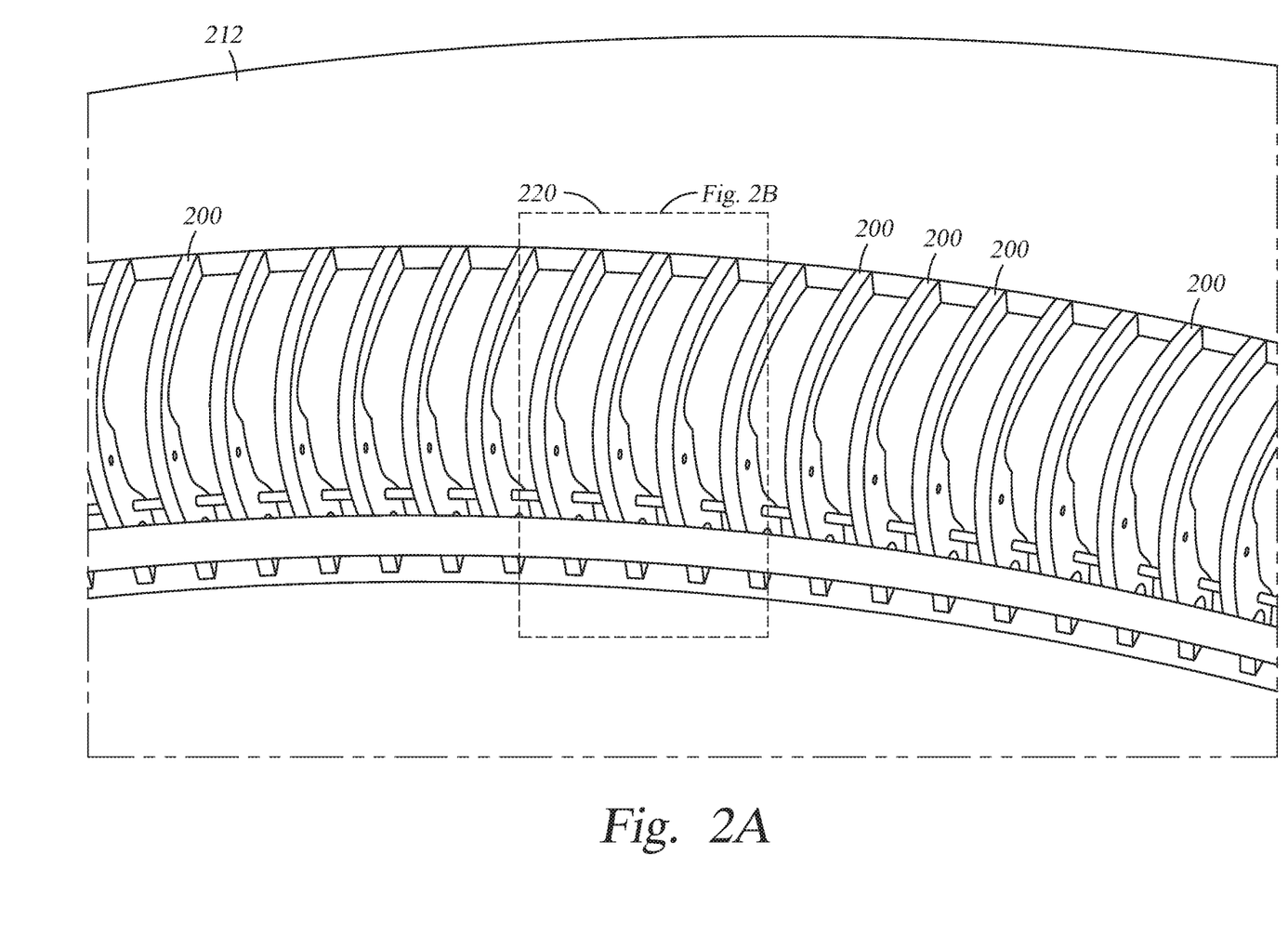
FIGS. 2A and 2B depict another example of a pulsejet-based ice management system installed within an aircraft engine nacelle.
Figure 2B:
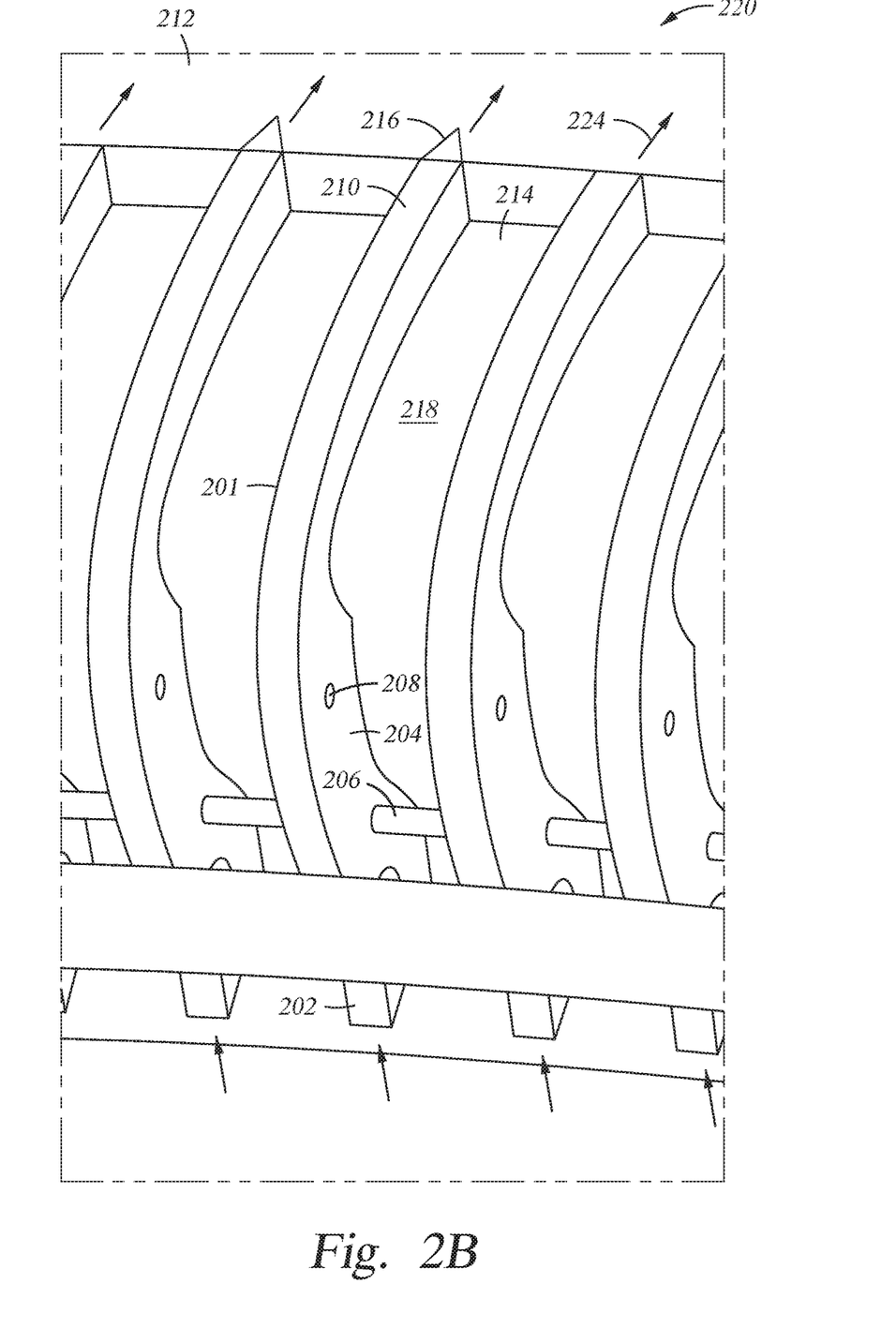

FIGS. 2A and 2B depict another example of a pulsejet-based ice management system installed within an aircraft engine nacelle.

In particular, FIG. 2A a plurality of pulsejets 200 are arranged radially around the leading edge of engine nacelle 212, though the leading edge surface is not depicted in this example in order to better show the arrangement of pulsejets below. In this example, "radial orientation" refers to an orientation of a pulsejet wherein the exhaust nozzle is pointed in a direction along a radial line extending from, for example, a centroid of a curved geometric volume (e.g., nacelle 212). Thus, in this example, the exhaust from the nozzles of pulsejets 200 promotes flow of the heated gas out the curved geometric volume of nacelle 212, rather than around it, as in the example described with respect to FIG. 1A. This orientation may alternatively be referred to as a linear flow orientation, in which the exhaust nozzle of a pulsejet is pointed in a direction within a geometric volume that will cause exhaust gases to flow out of the volume, such as shown by arrows 224 in FIG. 2B.

In this example, each pulsejet 200 may act as a supporting structure to the leading edge surface of engine nacelle 212 in addition to providing heat and vibration to the leading edge of nacelle 212 for ice management operations. As depicted, in this example, each pulsejet 200 is designed to match the aerodynamic profile of the overlying nacelle surface, as well as an underlying surface, so as to provide support for that surface.

The heated exhaust flows from pulsejets 200 heat the leading edge surface of engine nacelle 212 directly (e.g., through conductive heating) as well as convectively as the space between pulsejets 200 also heats up. Further, as above, when the pulsejets 200 run, they create vibrations (from the pulsed combustions) that also serve to dislodge any existing ice accumulation and to prevent any further ice accumulation.

Unlike the example depicted and described above with respect to FIGS. 1A and 1B, in this example, no separate duct or plenum is used to route hot exhaust gases other than the exhaust nozzle (e.g., 210) of each pulsejet.

FIG. 2B depicts a closer view of area 220 in FIG. 1A, and in particular focused on aspects of a specific pulsejet 201 of the plurality of pulsejets 200.

In this example, pulsejet 201 includes an inlet (or air intake) 202, which leads to combustor 204, which is fed fuel via fuel rail 206. Though not depicted in FIG. 2B, inlet 202 may be fed by an intake aperture at the surface of engine nacelle 212, such as a NACA duct flush with the surface. Use of NACA ducts may increase the pressure gradient across pulsejet 201 and thereby help to ensure reliable starting and consistent operation of pulsejet 201.

In this example, a common fuel rail runs between pulsejets 200. In other embodiments, other configurations may be used. For example, each pulsejet (e.g., 201) may have its own fuel feed, or different groups of pulsejets may share common fuel feeds or rails. One benefit of a common fuel rail when using a pressurized fuel delivery is the need for fewer fuel pumps to pressurize all of the fuel injectors (not depicted in FIG. 2B).

Pulsejet 201 further includes a cross-flow port 208, which allows combustion from adjacent pulsejets to cause combustion in pulsejet 201. Though not depicted in FIG. 2B, pulsejet 201 may also be equipped with an ignitor in other embodiments.

Pulsejet 201 further includes an exhaust nozzle 210 which flows into an exhaust aperture 216 on the surface of engine nacelle 212. In this example, exhaust nozzle 210, as with other aspects of pulsejet 201, is shaped to match the overlying surface and to thereby provide support for the overlying surface. Further, exhaust nozzle 210 is also supported by an underlying surface 218, which forms another part of the interior volume in which pulsejet 201 is located.

Further in this example, exhaust aperture 216 is shaped like a reverse NACA duct, which may beneficially increase the pressure gradient across pulsejet 201 (e.g., creating lower pressure suction based on external flow acceleration, and high pressure inside based on leading edge compression).

As mentioned above, pulsejet 201 has a complex geometry meant to match the aerodynamic profile of the overlying surface. In this example, that overlying surface is a leading edge of engine nacelle 212, but in other examples (such as described below), it could be any aerodynamic surface, such as the leading edge of a wing, stabilizer, or other aerodynamic control element. By forming a pulsejet to match the overlying surface, the pulsejet can act as a support element in addition to maximizing surface area for conductive heating between the hot exhaust nozzle of the pulsejet and the attached overlying surface.

In order to achieve a specific geometry, as depicted in FIG. 2B, pulsejets 200 may be 3D printed in some implementations. For example, in FIG. 2B, pulsejet 201 has been shaped to fit against both nacelle inner surface 214 as well as to support a nacelle outer surface (not depicted). 3D printing pulsejets may also enable the addition of supporting structures integrated into pulsejets so that structural value of the pulsejets are improved with minimal additional weight. For example, additional bracing structures may be added to the outer or inner geometries of pulsejets 200 to improve their structural properties.

Figure 3:
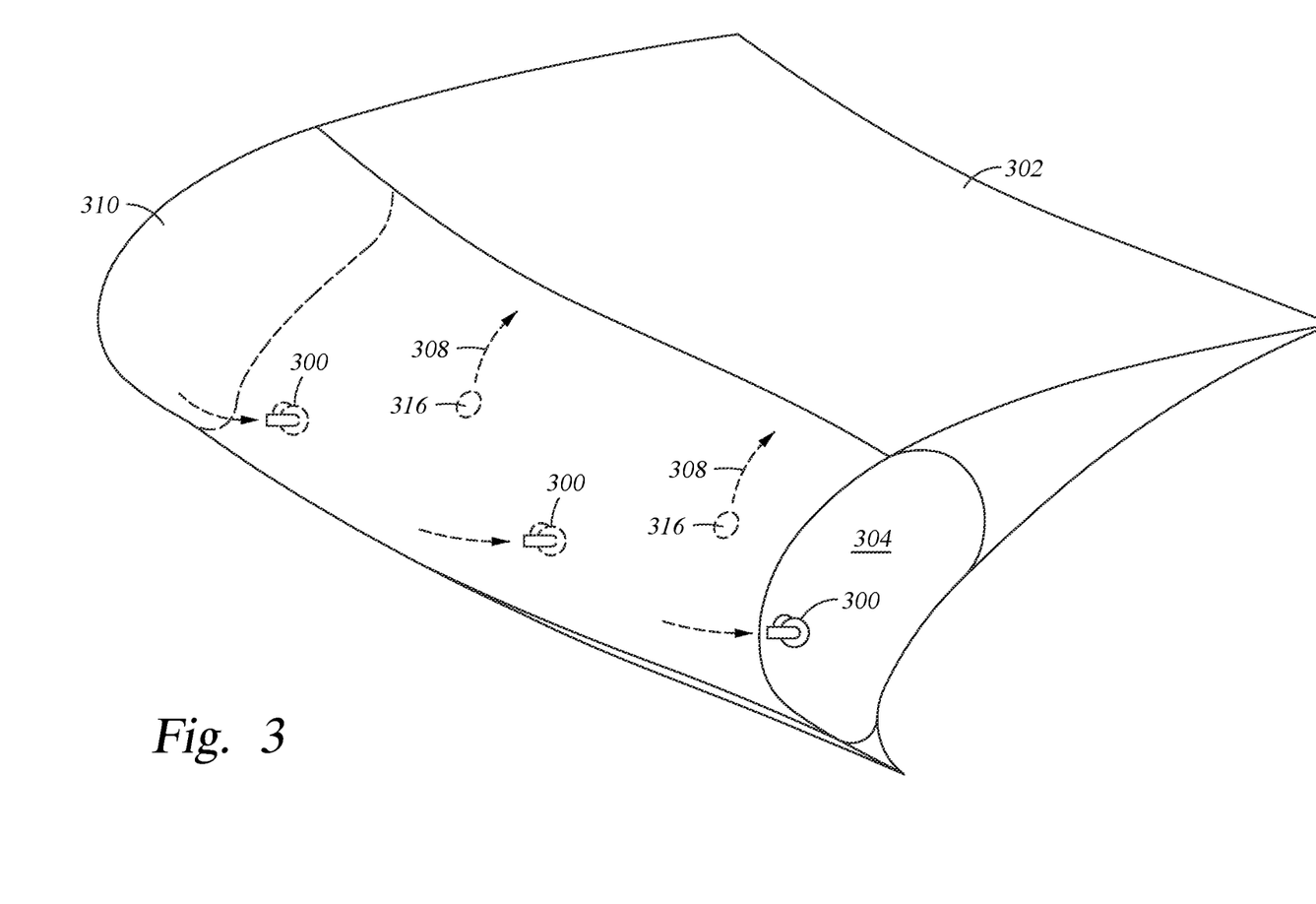
FIG. 3 depicts another example of a pulsejet-based ice management system installed within an aircraft aerodynamic element.

FIG. 3 depicts another example of a pulsejet-based ice management system installed within an aircraft aerodynamic element 302.

In particular, FIG. 3 depicts a plurality of pulsejets 300 installed within a portion of a control surface 310 of an aircraft, such as a wing slat. In this example, pulsejets 300 are installed such that their heated exhaust gases are expelled into a heated volume 304 (e.g., duct or plenum) of the aerodynamic element 302. By heating volume 304, the portion of aerodynamic element 302 likely to accumulate ice is heated so that any existing ice accumulation is removed and any further ice accumulation is prevented.

In this example, exhaust apertures 316 may comprise vents within the surface 310 of aerodynamic element 302 allow the exhaust gas 308 to escape heated interior volume 304. Further, because the exhaust gas 308 is heated and exhausted over the top surface 310 of aerodynamic element 302, it may create additional airflow that causes an increased low pressure zone above aerodynamic element 302, thus improving the lift performance of aerodynamic element 302.

While not depicted in FIG. 3 for simplicity, pulsejets 300 may include supporting features such as fuel injectors, fuel rails, ignitors and other features such as those described above in other examples.

Figure 4A:
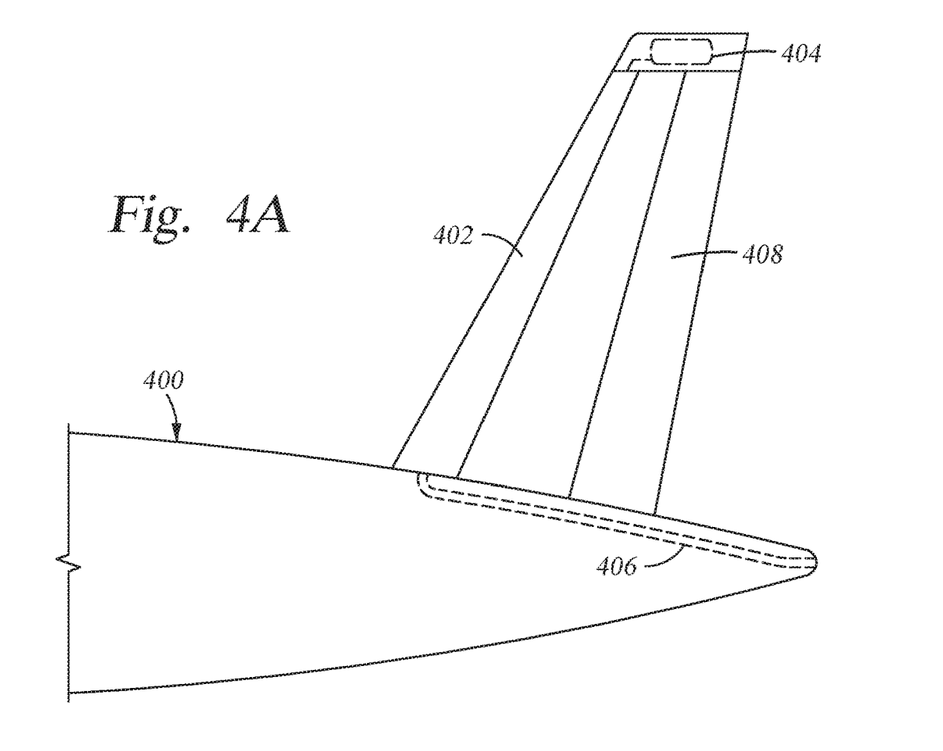
FIGS. 4A and 4B depict additional example of pulsejet-based ice management systems installed within an aircraft's control surfaces.
Figure 4B:
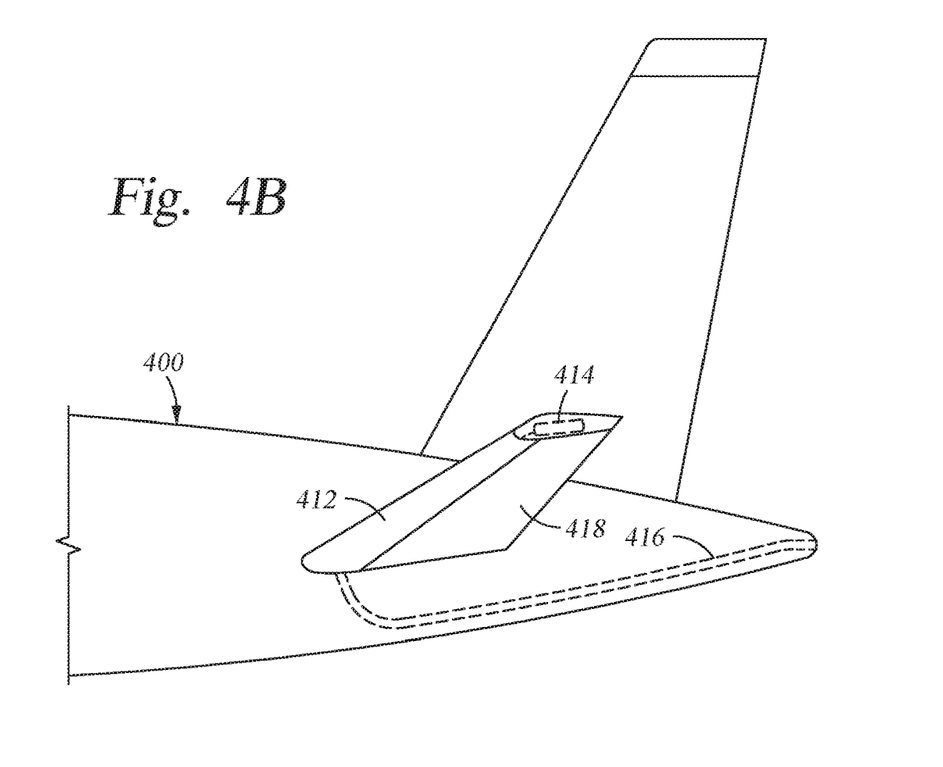

FIGS. 4A and 4B depict additional example of pulsejet-based ice management systems installed within an aircraft's control surfaces.

In particular, FIG. 4A depicts a surface 402 of a vertical stabilizer 408 of aircraft 400 that is heated by one or more pulsejets (not depicted) installed behind heated surface 402. In this example, heated surface 402 is a leading edge of vertical stabilizer 408, which may be most likely to accumulate ice.

Further in this example, a fuel tank 404 is depicted at the top of vertical stabilizer 408, which in this implementation assists with gravity feeding fuel to one or more pulsejets within heated surface 402. By having a separate fuel tank (separate from the main engine fuel tanks), the type of fuel used for the pulsejets may be different than the fuel used by the engines. Although, in other implementations, fuel tank 404 may be filled with jet fuel. In yet further implementations, fuel tank 404 may not be necessary. For example, a nearby fuel line (such as for an auxiliary power unit (APU)) may be tapped to provide fuel flow to the pulsejet(s) behind heated surface 402.

Further in this example, an exhaust pipe 406 is depicted exiting the rear extent of aircraft 400. In some implementations, exhaust pipe 406 may connected to an outlet in an interior volume behind heated surface 402 and routed alongside or into another exhaust pipe, such as the exhaust for an APU. In alternative implementations, the heated exhaust gas from the pulsejet(s) could be exhausted through vents in heated surface 402, such as those described above.

FIG. 4B depicts another implementation of pulsejets within an aircraft.

In particular, in this example surface 412 of horizontal stabilizer 418 of aircraft 400 is heated by one or more pulsejets (not depicted) located behind surface 412. As in the above example, heated surface 422 is a leading edge of horizontal stabilizer 418, which may be most likely to accumulate ice.

Further in this example, a fuel tank 414 is depicted at the outboard extent of horizontal stabilizer 418 on aircraft 400. In this example, horizontal stabilizer 418 is dihedral (i.e., higher at its outboard extent than at its inboard extent). Thus, placing fuel tank 414 at the outboard extent, which is the highest portion of horizontal stabilizer 418, creates a gravity assist for fuel delivery. In the case of an anhedral horizontal stabilizer, which is lower at its outboard extent than at its inboard extent, an inboard fuel tank may be preferred. Further, alternative implementations for the fuel source, such as described with respect to FIG. 4A may likewise be implemented with the horizontal stabilizer implementation depicted in FIG. 4B.

Further depicted in this example is an exhaust pipe 416 exiting the rear extent of aircraft 400. As above, in some implementations, exhaust pipe 416 may connected to an outlet in an interior volume behind heated surface 412 and routed alongside or into another exhaust pipe, such as the exhaust for an APU. In alternative implementations, the heated exhaust gas from the pulsejet(s) could be exhausted through vents in heated surface 412, such as those described above.

Figure 5:
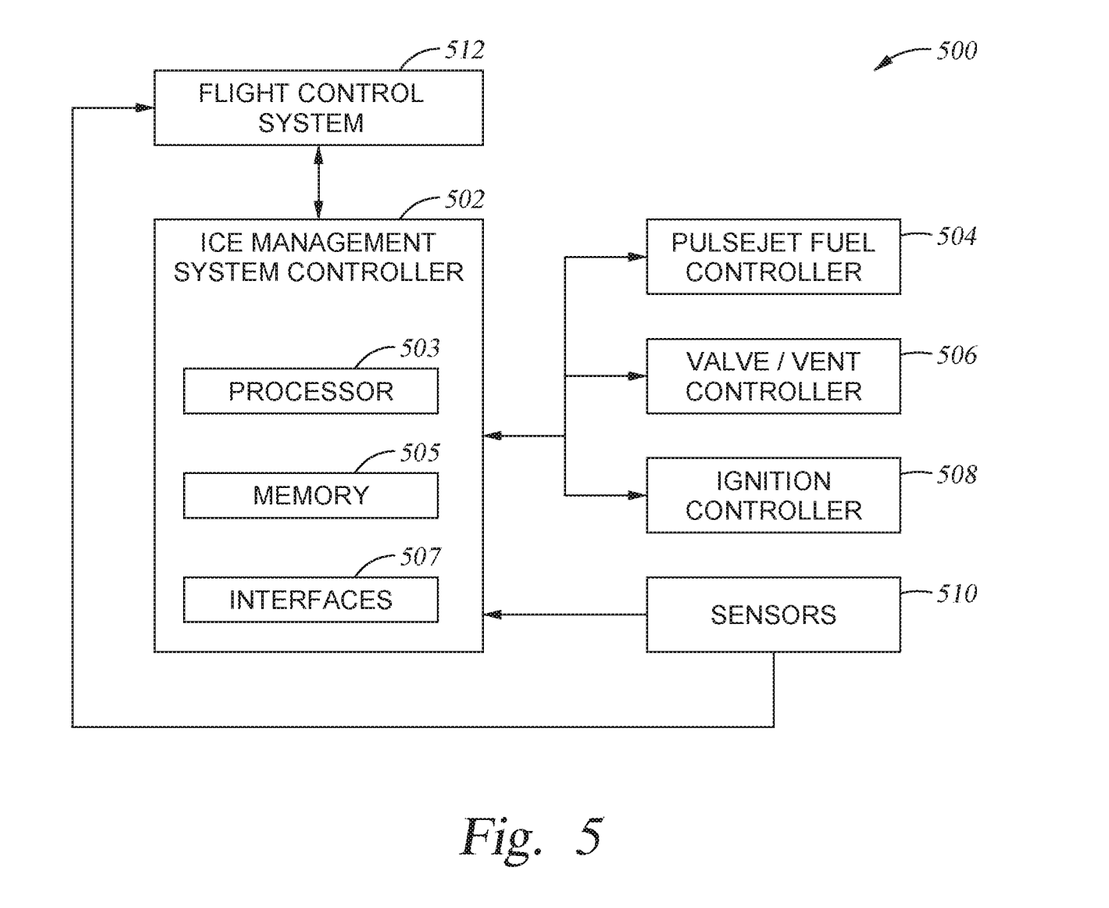
FIG. 5 depicts an example of an ice management control system.

FIG. 5 depicts an example of an ice management control system 500.

Ice management system controller 502 may include one or more processors 503, one or more memories 505 (e.g., comprising computer-executable instructions), one or more interfaces 507, such as one or more data buses, network interfaces, and/or electrical connections for communicating with other aspects of the control system 500.

In this example, ice management system controller 502 is connected to pulsejet fuel controller 504, which is configured to control the flow of fuel to pulsejets. For example, pulsejet fuel controller may include one or more fuel pumps, valves, or other mechanisms for controlling the flow of fuel. In implementations where a craft, such as an aircraft, has multiple independent pulsejet-based anti-ice and de-ice system (e.g., separate systems on engine nacelles, wing leading edges, and/or stabilizer leading edges), the fuel supply to each separate system may be individually controllable.

Ice management system controller 502 is further connected to valve/vent controller 506, which may be configured to open, close, and otherwise set the position of control valves, such as those described above with respect to FIGS. 1A and 1B. In some implementations, the valve or vent controller may be a motor, servo, or other electromechanical device capable of controlling the position of the valve or vent.

In some implementations, valve/vent controller 506 may be configured to set the position of valves in order to tune the acoustic output from one or more pulsejets and thereby create vibrations that may improve deicing and anti-icing operations, as described above.

Ice management system controller 502 is further connected to ignition controller 508, which may be configured to activate one or more ignition elements, such as spark plugs, glow plugs, or the like in order to activate one or more pulsejets.

Ice management system controller 502 is further connected to sensors 510. Sensors 510 may include, for example, temperature sensors mounted on or within surfaces, such as a leading edges of an engine nacelle or other aerodynamic elements and control surfaces in order to detect freezing conditions that may lead to ice accumulation. The same temperature sensors may be used to monitor the performance of the pulse-jet based heating system and to perform closed loop control. For example, once a target temperature is reached, the flow of fuel may be reduced or stopped altogether by ice management system controller 502.

Additional sensors may include flame or combustion detection sensors to ensure proper operation of the pulsejets while fuel flow is active.

Additional sensors may include acoustic sensors for providing active feedback to ice management system controller 502 to control valve positioning via valve/vent controller 506 to induce beneficial vibrations, as discussed above.

Additional sensors may include fuel flow, pressure, and temperature sensors and gas level sensors when an independent fuel tank is being used (such as described in examples with respect to FIGS. 4A and 4B).

These are just some examples of sensors 510, and others are possible.

Ice management system controller 502 may be connected to a flight control system 512, such as an aircraft flight control system, which may be configured to automatically activate ice management system controller 502 based on conditions. For example, ambient conditions such as temperature, weather (e.g., rain or snow), speed, altitude, wind direction, and others may be used to predict potential ice accumulation and to active elements of an ice management system automatically based on rules or thresholds or other logic.

In some examples, ice management system controller 502 might be a component of a Vehicle Management System (VMS), Vehicle Management System (VMC), or Mission management system (MMS), which in some examples may be a part of flight control system 512. For example, because ice buildup can result in instability or loss of control of an aircraft, a flight control system component, such as a VMS, VMC, or MMS, may receive sensor data 510 and activate the ice management system.

In one implementation, ice management system controller 502 may be activated by flight control broadcast messages, such as a warning message from an air traffic control system, indicating potential icing conditions based on an aircraft's current location, altitude, heading, etc., or based on reports from other nearby aircrafts.

In another implementation, ice management system controller 502 may transmit a message regarding its activation, which may include relevant sensor data, to a remote flight control system, such as an air traffic control system, in order to warn other aircraft in the vicinity about potential icing conditions. In some implementations, an aircraft receiving such a message may automatically activate its ice management system controller.

Ice management system controller 502 may also have manual activation and deactivation controls (not depicted), such as buttons or other control elements within an aircraft cockpit.

The preceding description is provided to enable any person skilled in the art to practice the various embodiments described herein. The examples discussed herein are not limiting of the scope, applicability, or embodiments set forth in the claims. Various modifications to these embodiments will be readily apparent to those skilled in the art, and the generic principles defined herein may be applied to other embodiments. For example, changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

The following claims are not intended to be limited to the embodiments shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. An ice management system, comprising:
  a plurality of pulsejets located within an interior volume of an aircraft and configured to heat an aircraft surface, wherein:
    the aircraft surface forms an outer portion of the interior volume;
    the aircraft surface comprises a leading edge portion of one of an engine nacelle, a wing slat, a vertical stabilizer, or a horizontal stabilizer; and
    each pulsejet of the plurality of pulsejets comprises:
      an inlet;
      a combustor;
      a fuel source; and
      an exhaust nozzle; and
  a plurality of intake apertures in the aircraft, wherein each intake aperture of the plurality of intake apertures corresponds to an inlet of one pulsejet of the plurality of pulsejets.

2. The ice management system of claim 1, wherein each pulsejet of the plurality of pulsejets is located within a separate, respective interior volume of the aircraft.

3. The ice management system of claim 1, further comprising: a plurality of exhaust apertures in the aircraft, wherein each exhaust aperture of the plurality of exhaust apertures is configured to expel heated gas from the interior volume.

4. The ice management system of claim 3, wherein each exhaust aperture of the plurality of exhaust apertures in the aircraft is configured to expel heated gas from one pulsejet of the plurality of pulsejets.

5. The ice management system of claim 1, wherein the aircraft surface is a leading edge portion of an engine nacelle.

6. The ice management system of claim 5, wherein each pulsejet of the plurality of pulsejets is in a circumferential orientation within the interior volume.

7. The ice management system of claim 5, wherein each pulsejet of the plurality of pulsejets is in a radial orientation within the interior volume.

8. The ice management system of claim 7, wherein a shape of each pulsejet of the plurality of pulsejets is configured to support at least a portion of an inner surface of the interior volume and at least a portion of an inner surface of the aircraft surface.

9. The ice management system of claim 1, wherein the aircraft surface is a leading edge portion of a wing slat.

10. The ice management system of claim 1, wherein the aircraft surface is a leading edge portion of a vertical stabilizer.

11. The ice management system of claim 10, further comprising: a fuel tank located within the vertical stabilizer and connected to the plurality of pulsejets.

12. The ice management system of claim 11, further comprising: an exhaust pipe connected to the interior volume.

13. The ice management system of claim 1, wherein the aircraft surface is a leading edge portion of a horizontal stabilizer.

14. The ice management system of claim 13, further comprising: a fuel tank located within the horizontal stabilizer and connected to the plurality of pulsejets.

15. The ice management system of claim 14, further comprising: an exhaust pipe connected to the interior volume.

16. The ice management system of claim 1, wherein:
each pulsejet of the plurality of pulsejets further comprises a cross-flow ignition port, and
at least one pulsejet of the plurality of pulsejets comprises an ignitor.

17. The ice management system of claim 1, wherein each pulsejet of the plurality of pulsejets is a valveless pulsejet.

18. The ice management system of claim 1, further comprising: an ice management system controller configured to:
control fuel flow to the plurality of pulsejets; and
control an ignitor associated with at least one pulsejet of the plurality of pulsejets.

19. A method, comprising:
activating a plurality of pulsejets, wherein:
each pulsejet of the plurality of pulsejets is located within an interior volume of an aircraft and configured to heat an aircraft surface, wherein:
the aircraft surface forms an outer portion of the interior volume;
the aircraft surface comprises a leading edge portion of one of an engine nacelle, a wing slat, a vertical stabilizer, or a horizontal stabilizer;
each pulsejet of the plurality of pulsejets comprises:
an inlet;
a combustor;
a fuel source; and
an exhaust nozzle; and
a plurality of intake apertures are located in the aircraft, wherein each intake aperture of the plurality of intake apertures corresponds to an inlet of one pulsejet of the plurality of pulsejets; and
receiving data from a sensor regarding operation of one or more of the plurality of pulsejets.

20. An ice management control system, comprising:
a memory comprising computer-executable instructions;
a sensor;
a processor in data communication with the sensor and configured to execute the computer-executable instructions and cause the ice management control system to:
activate a plurality of pulsejets, wherein:
each pulsejet of the plurality of pulsejets is located within an interior volume of an aircraft and configured to heat an aircraft surface, wherein:
the aircraft surface forms an outer portion of the interior volume;
the aircraft surface is a leading edge portion of one of an engine nacelle, a wing slat, a vertical stabilizer, or a horizontal stabilizer;
each pulsejet of the plurality of pulsejets comprises:
an inlet;
a combustor;
a fuel source; and
an exhaust nozzle; and
a plurality of intake apertures are located in the aircraft, wherein each intake aperture of the plurality of intake apertures corresponds to an inlet of one pulsejet of the plurality of pulsejets; and
receive data from the sensor regarding operation of one or more of the plurality of pulsejets.

* * * * *